US006775764B1

(12) United States Patent
Batcher

(10) Patent No.: US 6,775,764 B1
(45) Date of Patent: Aug. 10, 2004

(54) SEARCH FUNCTION FOR DATA LOOKUP

(75) Inventor: Kenneth W. Batcher, Hudson, OH (US)

(73) Assignee: Cisco Technology, Inc, San Jose, CA (US)

( * ) Notice: Subject to any disclaimer, the term of this patent is extended or adjusted under 35 U.S.C. 154(b) by 485 days.

(21) Appl. No.: 09/841,271

(22) Filed: Apr. 24, 2001

(51) Int. Cl.[7] .......................... G06F 9/34; G06F 17/30; G06F 12/00
(52) U.S. Cl. ..................... 712/227; 712/230; 707/3; 711/214; 711/219
(58) Field of Search .................. 712/210, 227, 712/230; 711/114, 125, 216, 219, 212, 209, 214; 380/264, 44; 713/171, 190; 707/6, 3; 379/355.06

(56) References Cited

U.S. PATENT DOCUMENTS

| 4,262,332 A | * | 4/1981 | Bass et al. ................. 711/114 |
| 5,167,026 A | * | 11/1992 | Murray et al. .............. 712/210 |
| 5,930,359 A | * | 7/1999 | Kempke et al. ...... 7379/355.06 |

* cited by examiner

Primary Examiner—Daniel H. Pan
(74) Attorney, Agent, or Firm—Tucker Ellis & West LLP

(57) ABSTRACT

A SEARCH function preferably built into the instruction set of a microprocessor for quickly and efficiently searching a plurality of memory locations. Data from a significant number of memory locations is searched in a very short period of time, using a minimal number of instruction cycles.

27 Claims, 5 Drawing Sheets

| Clock | ⎍⎍⎍⎍⎍⎍⎍⎍⎍⎍⎍⎍ | | | | | | | | | | |
|---|---|---|---|---|---|---|---|---|---|---|---|
| STATE | A | B | C | C | C | D | F | | | | |
| ADDR FETCH | 0x10 | 0x11 | 0x11 | 0x11 | 0x11 | 0x11 | 0x12 | | | | |
| MEM BUS | search | MRD | data | data | data | data x1101 | next fetch | | | | |
| ADDR SEARCH | | | 400 | 404 | 408 | 412 | | | | | |
| MDIR TAG | x1101 | x1101 | x1101 | x1101 | x1101 | x1101 | 412 | | | | |
| Count | 30 | 30 | 29 | 28 | 27 | 26 | 26 | | | | |

Fig. 5

SEARCH FUNCTION FOR DATA LOOKUP

FIELD OF INVENTION

The present invention generally relates to a system for locating data, and more specifically a search function for efficiently performing a plurality of memory read operations.

BACKGROUND OF THE INVENTION

In a typical wireless local area network (WLAN) configuration, a portable or mobile device (e.g., a laptop personal computer) normally includes a HOST processor and a PCI card or PCMCIA card. On this card resides a Medium Access Control (MAC) processing system, a PHY (physical layer) processing device (e.g., a digital signal processor), and a main memory. The MAC processing system includes a MAC processor (e.g., an embedded processor), which is a multi-functional processor engine responsible for a variety of different processing tasks associated with the wireless communications. The PHY processing device performs such functions as encoding/decoding waveforms. Data transferred between the PHY processing device and the MAC processing system (i.e., the PHY data stream) may be encrypted using an encryption algorithm, including, but not limited to: RC4, DES (Data Encryption Standard) or AES (Advanced Encryption Standard). Consequently, encrypted data received by the MAC processing system from the PHY processing device must be subsequently decrypted.

Similarly, in the case of a data transmission from the MAC processor to the PHY data processing device, the data originates from the HOST processor that writes the data as plaintext to the main memory. The MAC processor will at a later time read the data from the main memory and encrypt it, using an encryption algorithm. Then, the encrypted data is transmitted to the PHY processing device.

It should be appreciated that encryption algorithms typically require the use of a private key to ensure data security. One of the significant time consuming steps in decrypting data is searching memory to look up a private key associated with an incoming receive address. Beyond encryption, there are other needs for a fast lookup based on a network station address including, but not limited to, formulation of response frame (e.g. Acknowledge), multicast hashing, and searching the client database for other necessary information. Often times, there are many clients communicating with a station thus the database may be quite large having thousands of entries.

Wireless communications protocols such as 802.11 are highly demanding on the throughput requirements of modern day systems. Commonly, ASICs with embedded CPUs are needed in order to provide enough computing power to meet the requirements. The primary problem at the MAC layer with meeting the 802.11 timing is the turn around time between frames. In accordance with 802.11, the time interval between frames is known as the "interframe space" (IFS). Four different IFSs are defined to provide priority levels for access to a wireless media (listed in order, from the shortest to the longest): (a) SIFS short interframe space; (b) PIFS PCF interframe space; (c) DIFS DCF interframe space; and (d) EIFS extended interframe space.

In a receive scenario, where a communication device, such as a station, receives back-to-back encrypted frames, meeting the 10 $\mu$s SIFS ("short interframe space") time requirement is difficult. This is due to the need to finish processing of the decrypted frame before the next one arrives. Furthermore, with the advent of the 802.11A protocol, the SIFS time is even less, typically 6–8 $\mu$s due to PHY delay associated with OFDM latency. FIG. 1 illustrates a timing scenario.

One of the primary delays in this system is the time it takes to lookup the private key for decrypting the encrypted frames. After receiving a "receive address" in a MAC header, a key lookup procedure can commence. This can take a significant amount of time depending on how many keys the station has to search through to find the correct key. If the station is an access point, there could be thousands of MAC addresses to search through before finding the one having the correct key. After finding the private key, the decrypt algorithm initialization can commence, and then decryption of the frame can start. This may spill over into the time to process a subsequent frame. If private key lookup (based on MAC receive address) and decryption takes too long, the station will not complete the entire decryption process before the next packet arrives, causing the new packet to be dropped.

Another problem requiring fast data lookup is the ability to quickly respond to an incoming frame and send an acknowledgement back to the sender. Thus, a transmit after receive also requires tight timing. With 802.11 protocols an incoming reception often requires a send back to the origin node to acknowledge receipt of the message.

The receiving station also has turn around time issues with looking up the incoming address to decide if the message is coming from an authenticated and associated client. If so, further decoding of the message might be needed to decide if an acknowledgement is required or not. This all must be done before the SIFS interval has elapsed, hence the time to search the client address database might be critical.

In order to allow for speedy lookup, systems often use one of two approaches. A software-based approach known as "hashing" can be used to calculate random starting search address based on a MAC receive address. This hash function will hopefully generate a suitable random distribution of data, so that the search space can be reduced. A perfectly done hash will splice the search out into a number of "buckets" (i.e., subsets) each of which contains an equal number of entries corresponding to the hash address. Hence, for a search of 100 items with 10 buckets, each would ideally have 10 entries. With hashing, one just needs to calculate the hash to find the proper bucket, and search these smaller lists to find the target address. FIG. 2 illustrates the hashing procedure as described above.

The foregoing approach has drawbacks relating to the following: (a) the amount of time needed to calculate a good hash function, (b) the management of the hash table, and (c) a bad hash can impair performance, almost as bad as a straight linear search.

A hardware-based approach referred to as CAM (Content Addressable Memory) is often used to greatly speed up the search process. A is CAM is given content as an input (e.g., a unique data tag, such as a MAC rx address ID) and the output of the CAM provides the target (in this case another address pointer to the corresponding key) after a short delay. While performance can be quite good using CAM, there are several disadvantages to this approach as well: expensive memories, the time needed to load and manage the CAM, and the limits on CAM size (i.e., it may not be big enough to hold all key data without huge cost).

The present invention addresses these and other drawbacks of the prior art.

SUMMARY OF THE INVENTION

According to the present invention there is provided a method of operating a processor to determine the location of one or more tags respectively stored in one of a plurality of memory locations, comprising: fetching and executing a SEARCH instruction to execute an associated memory read instruction a plurality of times; fetching the associated memory read instruction to read the contents of one or more memory locations; loading a count register with a count value indicative of a maximum number of memory locations to be searched; and executing the associated memory read instruction one or more times to respectively read the contents of the one or more memory locations, wherein the associated memory read instruction is executed as many times as indicated by the count value, or until a search hit occurs.

According to another aspect of the present invention there is provided a processor for determining the location of one or more tags respectively stored in one of a plurality of memory locations, comprising: means for loading a count register with a count value indicative of a number of memory locations to be searched; means for fetching a SEARCH instruction; means for executing the SEARCH instruction to execute an associated memory read instruction a plurality of times; means for fetching the associated memory read instruction to read the contents of one or more memory locations; and means for executing the associated memory read instruction one or more times to respectively read the contents of the one or more memory locations, wherein the associated memory read instruction is executed as many times as indicated by the count value, or until a search hit occurs.

According to still another aspect of the present invention there is provided a processor for determining the location of one or more tags respectively stored in one of a plurality of memory locations, said processor comprising: a memory address register associated with a main memory; a memory data register associated with the main memory; a memory control for generating memory control signals; a program counter for storing a memory address location of the main memory where an instruction is to be fetched; an instruction register for storing an instruction that is to be executed; at least one general purpose register; decode and execute control logic for decoding and executing an instruction stored in the instruction register; and a state machine for controlling the fetching of a memory read instruction, and the execution thereof one or more times to respectively determine the contents of one or more memory locations.

An advantage of the present invention is the provision of a search function which provides fast and efficient searching of a plurality of memory locations.

Another advantage of the present invention is the provision of a search function which provides for fast and efficient locating of data.

Still another advantage of the present invention is the provision of a search function that can be conveniently added to an instruction and register set of a CPU (central processing unit).

Still another advantage of the present invention is the provision of a search function that minimizes the number of instructions cycles need to search a plurality of memory locations.

Yet another advantage of the present invention is the provision of a search function that is flexible and easy to use.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 5 shows a timing diagram for execution of a SEARCH instruction in accordance with the state diagram of FIG. 3.

DETAILED DESCRIPTION OF THE PREFERRED EMBODIMENT

Figure 1:
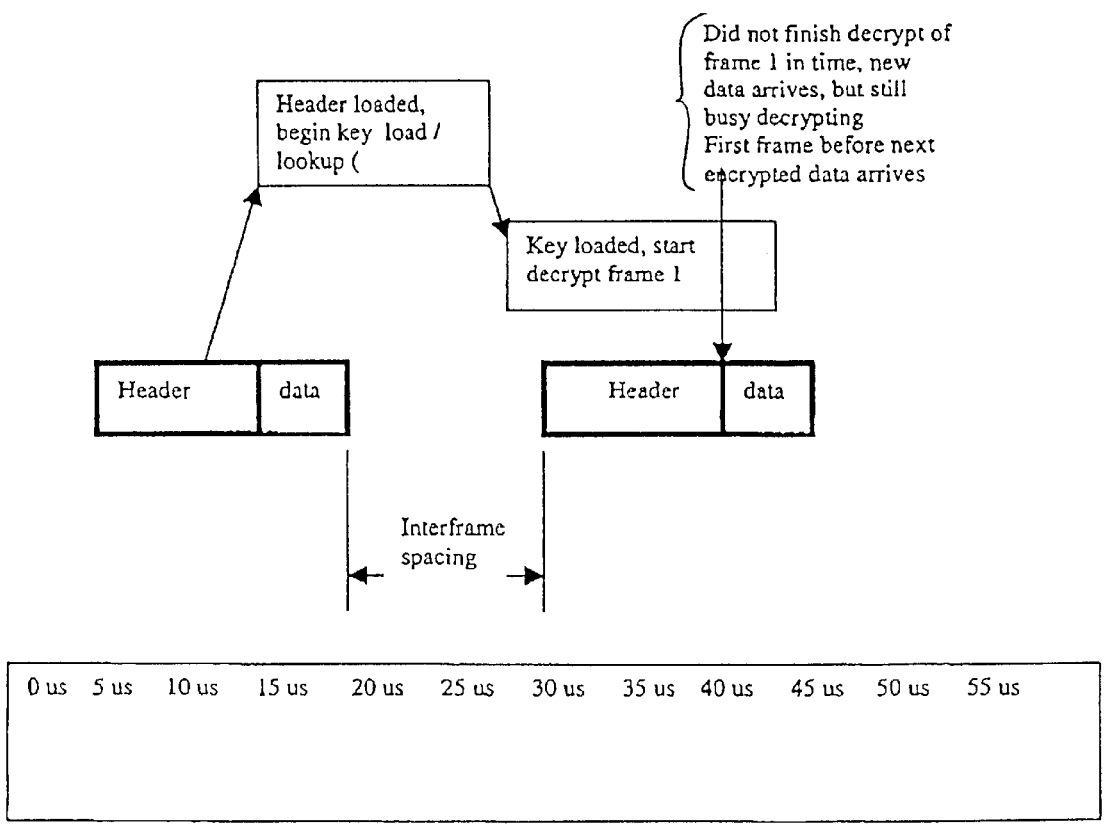
FIG. 1 shows a timeline that illustrates interframe spacing between consecutively received packets.
Figure 2:
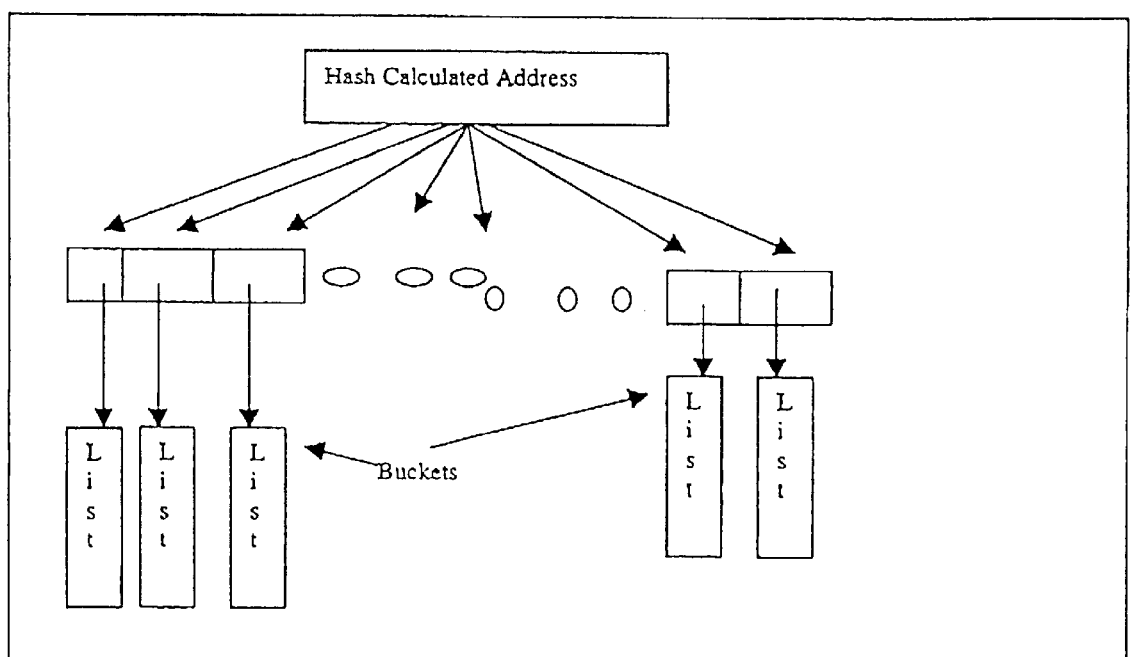
FIG. 2 illustrates a typical hashing procedure for calculating addresses.

It should be appreciated that while the search function of the present invention is illustrated herein in connection with locating a key for a data decryption operation, the search function of the present invention is contemplated for use in connection with other types of data search operations. In general any operation where a memory device is searched for the presence of a desired data element or set of data elements. Some examples include, but are not limited to: (a) searching an informational database in response to a query; (b) network routing of packets; (c) telephone switching circuitry; and (d) computer software spell checkers or virus scanners.

The element being searched for is generically referred to herein as a 'tag' which may represent an address (e.g., a KEY or target address) or similar data query item. The search function of the present invention includes an instruction referred to as SEARCH for facilitating the automation of a searching process. The SEARCH instruction is generally a subset of a REPEAT instruction, which is described in detail in related U.S. application Ser. No. 09/607,815 filed Jun. 30, 2000, entitled REPEAT FUNCTION FOR PROCESSING OF REPETITIVE INSTRUCTIONS STREAMS. In this regard, the SEARCH instruction repeats only a memory READ instruction. Furthermore, the SEARCH instruction autoincrements the address for the READ instruction, thus allowing for fast and efficient reading of a plurality of memory locations.

Like the REPEAT instruction, the SEARCH instruction does not require subsequent fetching of the READ instruction after the search begins. This offers a key advantage in efficiency requiring less CPU bus cycles.

Whereas a REPEAT instruction terminates at the end of a loop counter, the SEARCH instruction according to the present invention can terminate before reaching the end of a loop counter, when a data element corresponding to the desired key is read. The following exemplary code segment illustrates the SEARCH instruction. This code is assumed to start at an instruction address xD (hex).

| | | | |
|---|---|---|---|
| xD. | LODI | 400,R0 | ;starting address base address loaded |
| xE. | MOVI | 30,R1 | ;search 30 address locations |
| xF. | LODI | 0x1101,MDIR | ;look for tag (KEY address = hex x1101) |
| x10. | SEARCH | | ;repeat the instruction below, start scan |
| x11. | MRD | [R0]+4,MDIR | ;begin memory scan comparing against MDIR. Post increment address by 4 every time |
| x12. | SUB | R1,-2,NULL | ;was the KEY address found, count = -2 means not found |
| x13. | BC | Z,MISS | ;R1 is -2 if the KEY address not found, else MDIR has KEY address and branch will not be taken |
| x14. | MRD | [MDIR],R0 | ; read KEY address and place into R0 |

While subjected to a SEARCH, the read instruction (e.g., MRD [R0]+4,MDIR) is slightly modified so itwill not update the target data register (MDIR) with memory read data, but rather compare the memory read data with the contents of the target data register preloaded with the tag (KEY address=x1101).

In this example memory is scanned starting at address x400 until either 30 items are read, or until the unique pattern x1101 (KEY address) is read. Upon finding the KEY address, the search function stops, and the MDIR register is updated with the address containing the desired KEY address. The R1 counter register will stop decrementing on a search hit. Thus, a successful search terminates with a non-negative value in the counter register. If nothing was found after 30 reads, the R1 counter will be loaded with -2 to indicate a faulty search.

The present invention allows scanning of a linear list of N items in a worst case N+5 time. The 5 instruction cycles come from the overhead needed to prepare the search. With a large N value, the search overhead of 5 instruction cycles is of little consequence.

A pure software linear search method in accordance with the prior art uses 7 cycles in the inner loop to search memory per location, as illustrated below:

| Instruction | No. of Cycles | Comments |
|---|---|---|
| BACK | | |
| 1. MRD [R0]+4, MDIR | 2 | ; fetch instruction, then read data word, post increment |
| 2. SUBI R1, 1, R1; | 1 | decrement count |
| 3. BC NZ, done | 1 | ;last one? |
| 4. SUB MDIR, R3 | 1 | ;was the address found? |
| 5. BC Z, HIT | 1 | ;found address (HIT); R0 is correct location |
| 6. BR BACK | 1 | ;not yet done |
| 7 BC Z, HIT | | ; once done check last one, since this has not been done yet |
| 8. BR MISS | | ; all missed, so indicate miss |

Thus, the SEARCH method of the present invention provides an improvement of 7 times over prior art conventional methods.

In accordance with the present invention, the inner loop of the program code is one cycle, since hardware does the "memory read" and "compare" in one clock cycle. As with the REPEAT instruction described in related U.S. application Ser. No. 09/607,815, no instruction fetch is needed. The present invention accomplishes the equivalent of the above code in one cycle per search.

SEARCH
start of inner loop
MRD [R0]+4,MDIR    ;1 cycle to scan memory until all address locations searched, or until first hit is found
end of inner loop
CHECK counter register to see if hit or not.

Figure 3:
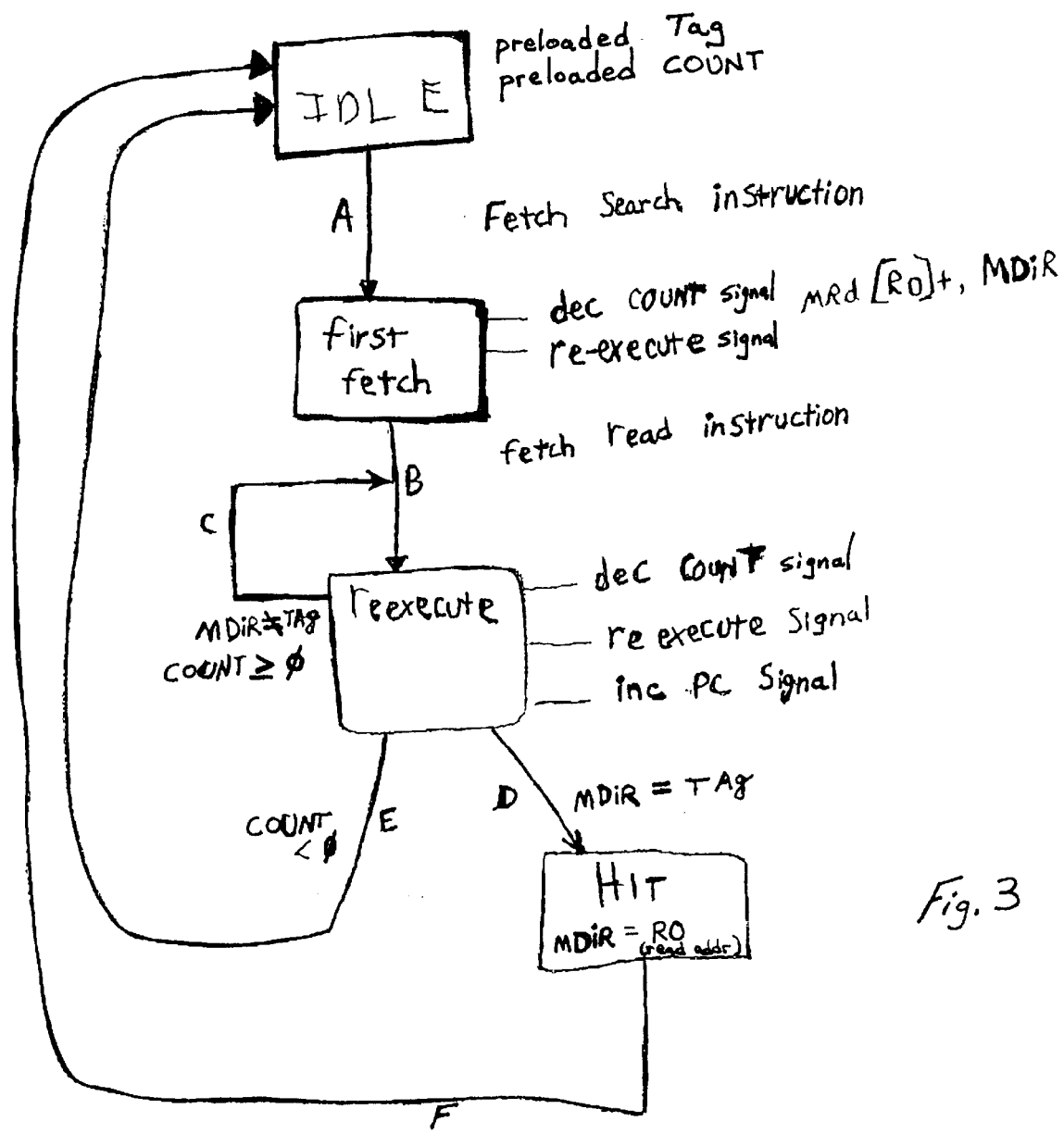
FIG. 3 shows a state diagram for execution of a SEARCH instruction in accordance with a preferred embodiment of the present invention.

Referring now to the drawings wherein the showings are for the purposes of illustrating a preferred embodiment of the invention only and not for purposes of limiting same, FIG. 3 shows a state diagram illustrating the operation of the SEARCH function of the present invention. The "count" identifying a maximum number of memory locations to search, and a "tag" (e.g., a target KEY) are preloaded into a count register prior to the IDLE state. However, it should be appreciated that in accordance with an alternative embodiment, a SEARCH instruction may include the count value that is stored in the count register, wherein execution of the SEARCH instruction stores the count value in said count register.

FIG. 5 provides a timing diagram corresponding to the execution of the SEARCH instruction sequence of the inner loop of the search instruction example described above. An explanation of the state transitions (FIG. 3) corresponding with the timing diagram is summarized in the table below:

| Fetch Address | State Transition | Comments |
|---|---|---|
| x10 | A | fetch SEARCH instruction |
| x11 | B | fetch memory read to MDIR instruction |
| x11 | C | Execute memory read and compare to MDIR, Address post/pre inc or dec |
| x11 | C | Execute memory read and compare to MDIR, Address post/pre inc or dec |
| x11 | C | Execute memory read and compare to MDIR, Address post/pre inc or dec |
| x11 | D | on 4$^{th}$ read, hit occurs (i.e., find tag or "target address") |
| x12 | F | Indicate hit; store address of tag in MDIR |

During the execution of the inner loop, four memory locations (starting with address 400) are searched in ascending order. The autoincrement in the example is a +4 corresponding to instruction "MRD [R0]+4, MDIR" of the instruction example. On the final memory location, the tag data is found and a hit address is indicated in the MDIR register. The entire sequence takes only 7 instruction cycles. The contents of the count register, instruction/address busses and MDIR register are also shown in FIG. 5.

Figure 4:
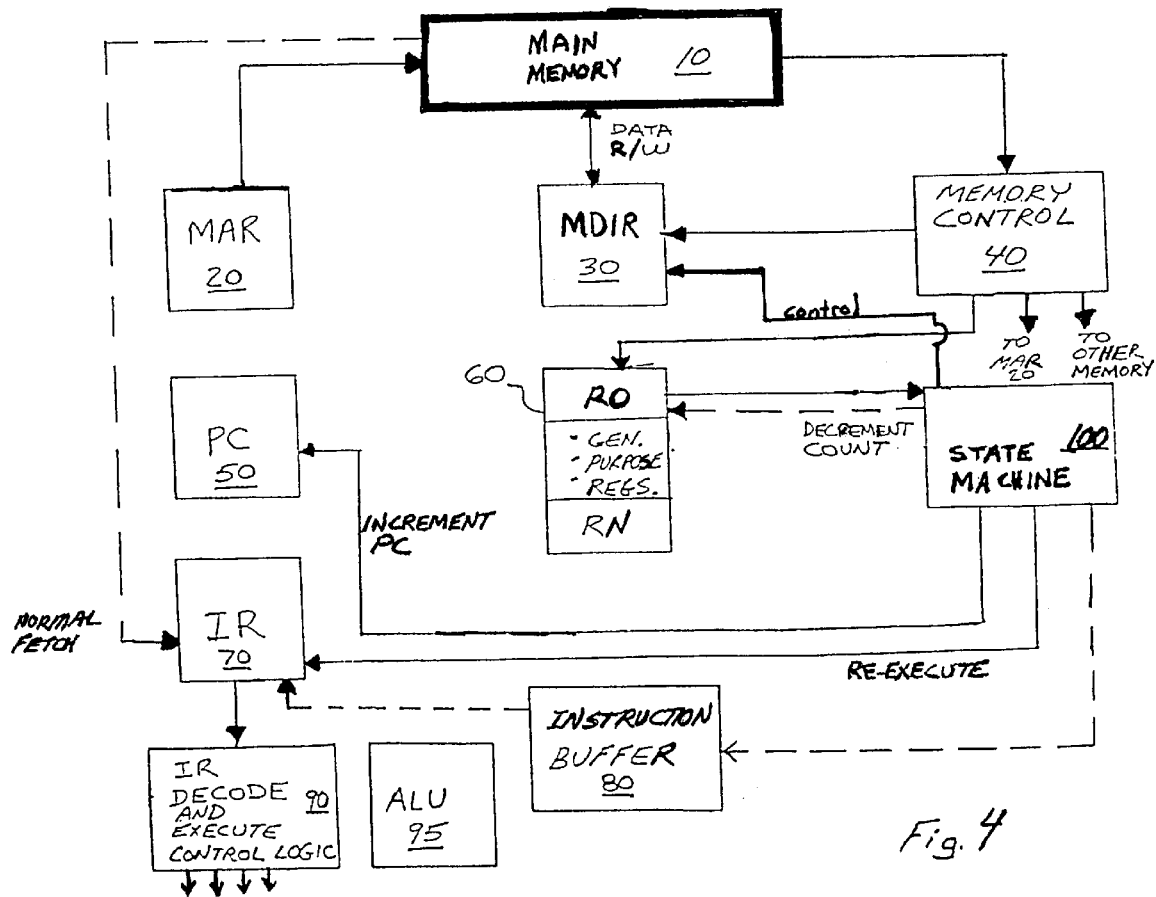
FIG. 4 shows an exemplary processor for implementing the SEARCH instruction of the present invention.

Referring now to FIG. 4, an exemplary processor for implementing the SEARCH instruction is illustrated. It should be appreciated that the processor illustrated in FIG. 4 is provided solely for the purposes of illustrating a preferred embodiment of the present invention, and that other processor designs (including non-RISC processors) may also be used for implementation of the SEARCH instruction of the present invention.

The processor is generally comprised of a memory address register (MAR) 20, a memory data register (MDIR) 30, a memory control 40, a program counter (PC) 50, a plurality of registers 60 (including R0), an instruction register (IR) 70, an instruction buffer 80, an instruction decode and execute control logic 90, an arithmetic logic unit (ALU) 95, and a search state machine 100. The processor is connected with a main memory 10 for exchange of data. It should be understood that not all interconnections among the processor elements are shown.

MAR 20 is used to hold the address of the location to or from which data is to be transferred. MDIR 30 contains the data to be written into or read out of the addressed location. IR 70 contains the instruction that is being executed. The output of IR 70 is available to the IR decode and execute control logic 90 that are needed to execute the instruction. PC 50 is a register that keeps track of the execution address of a program. It contains the memory address of the instruction currently being executed. A plurality of general purpose registers 60 store various values needed during processing, such as the COUNT value associated with the SEARCH instruction. Programs typically reside in main memory 10 which interfaces with the processor via a bus.

In accordance with a preferred embodiment of the present invention, the processor is a RISC machine. Processor control is hard coded in a preferred embodiment, rather than software microcode. The following register transfer logic (RTL) is implemented for the SEARCH instruction:

IDLE:
  IR←Fetch [SEARCH instruction]
  PC←PC+1
  R0←R0 (first memory location to be read—e.g., head of bucket)
  FIRST FETCH←IDLE (transition A)
FIRST FETCH:
  IR←[MEMORY READ instruction]
  PC←PC
  MDIR←[R0]
  COUNT←COUNT−1
  RE-EXECUTE←FIRST FETCH (transition B)
RE-EXECUTE:
  IR←IR
  R0←R0+1
  MDIR←[RO] (store contents at memory location RO into MDIR)
  COUNT←COUNT−1
  IF (COUNT≧0) and (MDIR not equal TAG)
    THEN PC←PC; RE-EXECUTE←RE-EXECUTE (transition C)
  ELSE IF MDIR=TAG THEN
    PC←PC+1; HIT←RE-EXECUTE (transition D)
  ELSE IF COUNT<0 THEN
    PC←PC+1; IDLE←RE-EXECUTE (transition E)
HIT
  MDIR←R0 (store read address in MDIR)
  IDLE←HIT (transition F)

It should be appreciated that the linear search function provided by the present invention provides better performance than a conventional search function needed to follow a linked list, which can happen with hashing. However, by combining the linear search function of the present invention with a hash, it is possible to develop a powerful search technique. The hash function is used to first reduce the search space. Then, a SEARCH instruction is used to follow this list of all elements in that bucket corresponding to the same hash address. This results in a software/hardware combination which gives good performance without the need for expensive CAMs.

The search function of the present invention can also augment a CAM or other pure hardware-based approach. If the number of items to be searched is N, assume the CAM is only large enough to hold K of the entries where K<N. The CAM which provides a fast lookup can be used to search the most common K entries of the list. If the CAM search fails, the SEARCH instruction can be used to search the remaining N–K entries. This provides a good tradeoff approach where N is too large to be placed totally into the CAM logic.

It should be appreciated that one of the advantages of the present invention is that the SEARCH function can be built into an existing instruction set and register set of a CPU. Only a simple state machine and slight modification to CPU central control signals need to be done in order to implement the present invention in any CPU. This makes it possible to create flexible and efficient software programs utilizing the search instruction. Being in the register set, the SEARCH instruction allows software programs to resume a search upon achieving a hit and search for a different tag. Since the count and address registers update state as the search progresses, it is possible to perform resume operations.

Alternative embodiments of the present invention may include the ability to search for more than one tag. Thus, the search process would terminate if one of a possible list of tags is found in the memory stream. In yet another alternative embodiment, the search process may terminate only if all of a group of N tags are found. It should be further appreciated that alternative methods may be suitable for indicating the search hit or miss result (a search miss is indicative that a search hit has not occurred with respect to reading the contents of a memory location), including but limited to: (a) interrupting the CPU; (b) storing a hit/miss indicator in a condition code; and (c) returning multiple hit addresses in different registers if a group of tags is searched. An yet another alternative embodiment, the search process may include altering the auto-increment or auto-indecrement depending on tag comparison result. This enables the SEARCH instruction to follow a different data structure other than a linked list, which can outperform a linear search.

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

What is claimed is:

1. A method of operating a processor to determine the location of one or more tags respectively stored in one of a plurality of memory locations, comprising:

fetching and executing a SEARCH instruction to execute an associated memory read instruction a plurality of times; wherein said SEARCH instruction includes as an operand said count value that is stored in said count register, wherein execution of the SEARCH instruction stores the count value in said count register;

fetching the associated memory read instruction to read the contents of one or more memory locations;

loading a count register with a count value indicative of a maximum number of memory locations to be searched; and executing the associated memory read instruction one or more times to respectively read the contents of the one or more memory locations, wherein the associated memory read instruction is executed as many times as indicated by the count value, or until a search hit occurs.

2. A method according to claim 1, wherein said search hit occurs when one of said one or more tags is read from a memory location.

3. A method according to claim 1, wherein said search hit occurs when all of said one or more tags is read from a respective memory location.

4. A method according to claim 1, wherein said search hit is indicated by at least one of: interrupting a CPU; storing a hit indicator in a condition code; and returning a plurality of hit addresses to a respective plurality of registers.

5. A method according to claim 1, wherein a search miss is indicated by at least one of: interrupting a CPU; storing a miss indicator in a condition code; and returning a plurality of miss addresses to a respective plurality of registers, wherein the search miss is indicative that a search hit has not occurred with respect to reading the contents of a memory location.

6. A method of operating a processor according to claim 1, wherein said count value is stored in said count register before execution of said SEARCH instruction.

7. A method of operating a processor according to claim 1, wherein said method further comprises:
   decrementing said count value in accordance with each execution of said memory read instruction.

8. A method according to claim 1, wherein the method further comprises:
   determining whether said count value is less than zero.

9. A method according to claim 1, wherein the method further comprises:
   storing the address of the memory location having the tag in a register.

10. A processor for determining the location of one or more tags respectively stored in one of a plurality of memory locations, comprising:
   means for loading a count register with a count value indicative of a number of memory locations to be searched;
   means for fetching a SEARCH instruction; wherein said SEARCH instruction includes said count value that is stored in said count register, wherein execution of the SEARCH instruction stores the count value in said count register;
   means for executing the SEARCH instruction to execute an associated memory read instruction a plurality of times;
   means for fetching the associated memory read instruction to read the contents of one or more memory locations; and
   means for executing the associated memory read instruction one or more times to respectively read the contents of the one or more memory locations, wherein the associated memory read instruction is executed as many times as indicated by the count value, or until a search hit occurs.

11. A processor according to claim 10, wherein said search hit occurs when one of said one or more tags is read from a memory location.

12. A processor according to claim 10, wherein said search hit occurs when all of said one or more tags is read from a respective memory location.

13. A processor according to claim 10, wherein said search hit is indicated by at least one of: interrupting the processor; storing a hit indicator in a condition code; and returning a plurality of hit addresses to a respective plurality of registers.

14. A system according to claim 10, wherein a search miss is indicated by at least one of: interrupting the processor; storing a miss indicator in a condition code; and returning a plurality of miss addresses to a respective plurality of registers, wherein the search miss is indicative that a search hit has not occurred with respect to reading the contents of a memory location.

15. A processor according to claim 10, wherein said count value is stored in said count register before execution of said SEARCH instruction.

16. A processor according to claim 10, wherein said processor further comprises:
   means for decrementing said count value in accordance with each execution of said memory read instruction.

17. A processor according to claim 10 wherein the processor further comprises:
   means for determining whether said count value is less than zero.

18. A processor according to claim 10, wherein the processor further comprises:
   means for storing the address of the memory location having the tag in a register.

19. A processor for searching the location of one or more tags respectively stored in one of a plurality of memory locations, said processor comprising:
   a memory address register associated with a main memory;
   a memory data register associated with the main memory;
   a memory control for generating memory control signals;
   a program counter for storing a memory address location of the main memory where read instruction is to be fetched;
   an instruction register for storing SEARCH instruction that is to be executed; wherein said SEARCH instruction includes said count value that is stored in a count register, wherein execution of the SEARCH instruction is adapted to store the count value in said count register;
   decode and execute control logic for decoding and executing an instruction stored in the instruction register; and
   a state machine for controlling the fetching of the read instruction, and the execution thereof one or more times to respectively determine the contents of one or more memory locations.

20. A processor according to claim 19, wherein said processor further comprises an instruction buffer for storing the one or more associated instructions.

21. A processor according to claim 19, wherein said general purpose register includes a first register for storing a count value indicative of the maximum number of times said memory read instruction is to be executed in accordance with the search instruction.

22. A processor according to claim 21, wherein said state machine generates signals for decrementing the count value stored in the first register.

23. A processor according to claim 21, wherein said state machine generates a signal for executing said memory read instruction stored in said instruction register.

24. A processor according to claim 19, wherein said state machine generates a signal for incrementing said program counter.

25. A processor according to claim 19, wherein said state machine continues to execute said memory read instruction until the memory read instruction has been executed as many times as indicated by the count value, or until a search hit occurs.

26. A processor according to claim 25, wherein said search hit occurs when one of said one or more tags is read from a memory location.

27. A processor according to claim 25, wherein said search hit occurs when all of said one or more tags is read from a respective memory location.

* * * * *